(12) United States Patent
Lacaze et al.

(10) Patent No.: US 12,503,034 B2
(45) Date of Patent: Dec. 23, 2025

(54) SYSTEMS AND METHODS FOR TRAILER DOOR SAFETY

(71) Applicant: Robotic Research OpCo, LLC, Clarksburg, MD (US)

(72) Inventors: Alberto Daniel Lacaze, Potomac, MD (US); William Becker, Monrovia, MD (US)

(73) Assignee: Robotic Research, LLC, Clarksburg, MD (US)

(*) Notice: Subject to any disclaimer, the term of this patent is extended or adjusted under 35 U.S.C. 154(b) by 71 days.

(21) Appl. No.: 18/687,220

(22) PCT Filed: Aug. 29, 2022

(86) PCT No.: PCT/US2022/041933
§ 371 (c)(1),
(2) Date: Feb. 27, 2024

(87) PCT Pub. No.: WO2023/034233
PCT Pub. Date: Mar. 9, 2023

(65) Prior Publication Data
US 2025/0115178 A1    Apr. 10, 2025

Related U.S. Application Data

(60) Provisional application No. 63/238,141, filed on Aug. 28, 2021.

(51) Int. Cl.
*B60P 7/06* (2006.01)
*E05B 83/10* (2014.01)
*G07C 5/00* (2006.01)

(52) U.S. Cl.
CPC ............... *B60P 7/06* (2013.01); *E05B 83/10* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 11,429,099 B2 | 8/2022 | Smith et al. | |
| 2012/0209502 A1* | 8/2012 | Nichols | B62D 53/021 701/124 |
| 2016/0050356 A1* | 2/2016 | Nalepka | H04N 7/181 348/148 |
| 2016/0090760 A1* | 3/2016 | Rettig | E05C 17/36 292/264 |
| 2016/0239801 A1* | 8/2016 | Burch, V | G06Q 10/0838 |
| 2017/0351268 A1* | 12/2017 | Anderson | G07C 5/0825 |
| 2019/0130351 A1* | 5/2019 | Arena | G06Q 10/0833 |
| 2019/0322319 A1 | 10/2019 | Smith et al. | |

FOREIGN PATENT DOCUMENTS

CA      2387029 C  *  8/2005  ........... E05C 19/186

OTHER PUBLICATIONS

Written Opinion for PCT/US22/41933 dated Dec. 7, 2022; 5 pps.
International Search Report for PCT/US22/41933 dated Dec. 7, 2022; 3 pps.

* cited by examiner

*Primary Examiner* — Muhammad Adnan
(74) *Attorney, Agent, or Firm* — Rowan Tree Law Group, PLLC; Carson C. K. Fincham

(57) ABSTRACT

Systems and methods for trailer door safety and shifted cargo management that are directed to reducing the likelihood of risk of injury due to shifted cargo and other undesirable cargo events.

15 Claims, 8 Drawing Sheets

SYSTEMS AND METHODS FOR TRAILER DOOR SAFETY

CROSS-REFERENCE TO RELATED APPLICATION

This application claims benefit of and priority and is a § 371 National Stage filing of International Patent Application No. PCT/US22/41933 filed on Aug. 29, 2022 and titled "SYSTEMS AND METHODS FOR TRAILER DOOR SAFETY", which itself claims benefit and priority under 35 U.S.C. § 119 (e) to, and is a Non-provisional of, U.S. Provisional Patent Application No. 63/238,141 filed on Aug. 28, 2021 and titled "SYSTEMS AND METHODS FOR TRAILER DOOR SAFETY", each of which is hereby incorporated by reference herein in its entirety.

SUMMARY

Embodiments of the disclosure provide systems and/or methods for trailer door safety and shifted cargo management that are directed to reducing the likelihood of risk of cargo damage and/or operator injury due to shifted cargo.

BACKGROUND

The transportation of cargo, whether via truck/trailer, train, ship, or aircraft, is fraught with the danger of shifting cargo causing a variety of losses. Shifting cargo may, for example, cause damage to the cargo itself (e.g., in the case of fragile cargo and/or cargo that must remain upright), cause damage to the vehicle and/or container in which it is transported, negatively affect the performance of a transport vehicle (e.g., in the worst cases, causing ships to sink, tractor trailers to overturn, or aircraft to become unbalanced and crash), and cause injury or death, such as in the case that trailer doors are opened and shifted cargo falls on a person. Unloading accidents are currently mitigated utilizing tow straps or specialized shorter-length straps that are coupled between points external to two cooperating trailer doors such that upon opening one of the doors the strap will limit the amount that the opened door may swing outward, thereby restraining any shifted cargo.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments described herein are provided at least in part to alleviate deficiencies of current shifted cargo injury prevention systems and methods. While door restraint straps are inexpensive and easy to use, for example, their entire benefit rests upon the operator (e.g., truck driver and/or unloader) remembering (and/or wanting) to employ them. Operators are not likely to use the straps when they are in a hurry, for example, or when they personally believe the risk of injury to be low (e.g., they assume the cargo is too light to cause serious harm and/or they assume no shifting has occurred). The straps are also solely reactive in nature. They do not permit insight into cargo status before a door is opened and accordingly, while preventing injury, permit shifted cargo to wedge the partially opened door against the straps. While this situation is less dangerous than having the cargo spill out of the transport vehicle/container, it is nonetheless a dangerous situation that requires remediation. Embodiments herein attempt to alleviate these and other deficiencies of previous and current systems and practice by providing systems and methods that offer proactive cargo management and shifted cargo injury prevention.

II. Trailer Door Safety Systems

Figure 1:
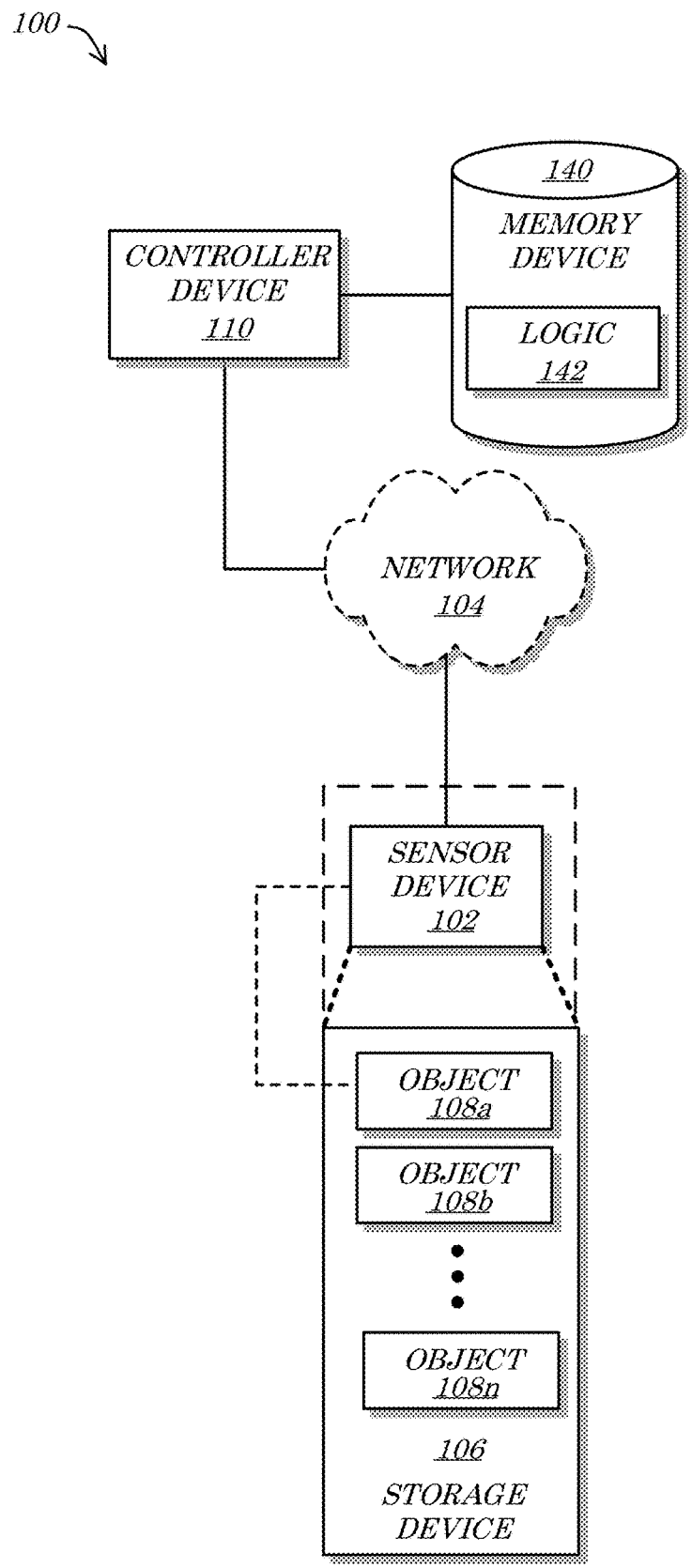
FIG. 1 is a block diagram of a system according to some embodiments.

Referring first to FIG. 1, a block diagram of a system 100 according to some embodiments is shown. In some embodiments, the system 100 may comprise a user and/or sensor device 102 communicatively coupled to a network 104 (or other communications object such as a computer bus, wires, cables, etc.). In some embodiments, the sensor device 102 may comprise an imaging, pressure sensing, motion sensing, and/or other input device that is disposed (e.g., coupled) to capture, record, and/or monitor data descriptive of a storage device 106 and/or one or more objects 108*a-n* stored (and/or transported) by and/or within the storage device 106. According to some embodiments, the sensor device 102 may be in communication with (e.g., via the network 104) and/or may provide indications of the data to a controller device 110. According to some embodiments, the controller device 110 and/or the sensor device 102 may be in communication with (e.g., via the network 104) a memory device 140 (e.g., storing logic 142). In accordance with various embodiments herein, the sensor device 102 may be utilized to obtain data descriptive of the storage device 106 and the objects 108*a-n* thereof, such as to facilitate detection and/or remediation of cargo shifting and/or tipping events. In some embodiments, the captured imagery/data may be provided from the sensor device 102 to the controller device 110 for imagery/sensor data analysis and execution of stored analysis rules and/or logic (e.g., the logic 142). In such a manner, for example, data descriptive of the storage device 106 and the objects 108*a-n* may be input into the system 100 and utilized to identify, classify, and/or compute cargo status analytic metrics (e.g., a cargo assessment) for the storage device 106 and/or the objects 108*a-n*, such as to preemptively address unsafe (and/or otherwise undesirable) events with respect to the storage device 106 and the objects 108*a-n*.

Fewer or more components 102, 104, 106, 108*a-n*, 110, 140, 142 and/or various configurations of the depicted components 102, 104, 106, 108*a-n*, 110, 140, 142 may be included in the system 100 without deviating from the scope of embodiments described herein. In some embodiments, the components 102, 104, 106, 108*a-n*, 110, 140, 142 may be similar in configuration and/or functionality to similarly named and/or numbered components as described herein. In some embodiments, the system 100 (and/or portions thereof) may comprise an automatic trailer door safety alert and/or restraining program, system, and/or platform programmed and/or otherwise configured to execute, conduct, and/or facilitate various methods such as the method 400 of FIG. 4 herein.

The sensor device 102, in some embodiments, may comprise any number, type, combination, or configuration of device, sensor, and/or object that is capable of capturing imagery, motion, pressure, light, strain, and/or other data descriptive of storage device 106 and/or the objects 108a-n thereof. The sensor device 102 may comprise, for example, a camera and/or a ranging device such as a Light Detection and Ranging (LiDAR) device. In some embodiments, the sensor device 102 may comprise a multispectral imaging device capable of capturing three or four band imagery data (e.g., RGB plus Near IR). The imagery and/or other data captured by the sensor device 102 may generally comprise any type, quantity, and/or format of digital, analog, photographic, video, pressure, light, strain, and/or other sensor data descriptive of the storage device 106 and/or the objects 108a-n thereof. According to some embodiments, the data captured and/or acquired by the sensor device 102 may comprise one or more images captured from different positions and/or locations in or proximate to the storage device 106 and/or the objects 108a-n, such as a plurality of individual images taken at different bearings from a given position and/or a single panoramic image taken from the given position.

In some embodiments, the sensor device 102 may also or alternatively comprise a server and/or datastore (e.g., the controller device 110 and/or the memory device 140) that is configured to provide the imagery and/or other data descriptive of the storage device 106 and/or the objects 108a-n. The sensor device 102 may comprise, for example, a third-party and/or vendor device configured to supply sensor data acquired from various cameras, sensors, and/or other sources. According to some embodiments, the sensor device 102 may comprise a user device incorporating sensor capabilities such as any type or configuration of computing, mobile electronic, network, user, and/or communication device that is or becomes known or practicable. The sensor device 102 may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. In some embodiments, the sensor device 102 may comprise one or more devices owned and/or operated by one or more users and/or entities such as a shipping and/or trucking company, a cargo management company, a shipper, a supplier, a warehousing entity, etc.

According to some embodiments, the sensor device 102 may communicate with the controller device 110 via the network 104 to provide data captured by the sensor device 102 for analysis and/or assessment of the storage device 106 and/or the objects 108a-n, as described herein. According to some embodiments, the sensor device 102 may store and/or execute specially programmed instructions (such as a mobile device application) to operate in accordance with embodiments described herein. The sensor device 102 may, for example, execute one or more mobile device programs that activate and/or control the sensor device 102 and/or that analyze data descriptive of the storage device 106 and/or the objects 108a-n, e.g., to identify, locate, and/or classify one or more of the objects 108a-n, identify one or more rules associated with the objects 108a-n, evaluate the one or more rules, identify an undesirable cargo status or condition, and/or provide output to warn an operator of a dangerous condition and/or to facilitate remediation of the condition.

The network 104 may, according to some embodiments, comprise a Local Area Network (LAN; wireless and/or wired), cellular telephone, Bluetooth® and/or Bluetooth® Low Energy (BLE), Near Field Communication (NFC), and/or Radio Frequency (RF) network with communication links between the controller device 110, the sensor device 102, and/or the memory device 140. In some embodiments, the network 104 may comprise direct communications links between any or all of the components 102, 110, 140 of the system 100. The sensor device 102 may, for example, be directly interfaced or connected to the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The sensor device 102 may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 110, 140 of the system 100. The network 104 may comprise one or more cellular telephone networks with communication links between the sensor device 102 and the controller device 110, for example, and/or may comprise a BLE, NFC, RF, and/or "personal" network comprising short-range wireless communications between the sensor device 102 and one or more of the objects 108a-n, for example.

According to some embodiments, the storage device 106 may comprise any location, device, machine, and/or other object capable of containing, carrying, housing, moving, and/or transporting one or more of the objects 108a-n. The storage device 106 may comprise, for example, a room, a trailer, a storage tank, a storage and/or shipping container, ship, truck, aircraft (and/or cargo hold thereof), and/or train. In some embodiments, the storage device 106 may be identified by one or more location parameters, such as an address, postal code, map quadrant, a particular building and/or structure, a room, and/or one or more coordinates and/or other identifiers (e.g., a unique geo-referenced location identifier such as latitude and longitude coordinates and/or a Global Positioning System (GPS) coordinate). According to some embodiments, the storage device 106 may comprise the one or more objects 108a-n. In the case that the storage device 106 comprises a shipping container or trailer, for example, the objects 108a-n may comprise various items of cargo such as boxes, crates, pallets, drums, etc. According to some embodiments, the storage device 106 may be identified by a unique identifier and/or code that is stored (e.g., in the memory device 140) in relation to (e.g., creating a stored link with) the objects 108a-n.

In some embodiments, the objects 108a-n may comprise any type and/or quantity of objects disposed in or on the storage device 106. The objects 108a-n may comprise one or more static, dynamic, dry, wet/liquid, non-electronic, and/or electronic object types. The objects 108a-n may comprise, for example, any type and/or quantity of cargo and/or storage items such as gas cylinders, boxes of consumer electronics, pallets of paving stones, and/or one or more liquid storage containers. According to some embodiments, one or more of the objects 108a-n such as a first object 108a, as depicted, may be in communication with the sensor device 102. The first object 108a may, for example, provide and/or transmit location and/or movement information to the sensor device 102, e.g., to facilitate tracking and/or location identification (of the first object 108a) by the sensor device 102. In some embodiments, the first object 108a may comprise a communication device (not separately shown) operable to transmit and/or receive data and/or may comprise one or more motors, actuators, solenoids, switches, lights, and/or other input and/or output devices operable to be controlled upon receipt of appropriate commands (e.g., sent from the sensor device 102 and/or the controller device 110).

In some embodiments, the controller device 110 may comprise an electronic and/or computerized controller device, such as a computer server and/or server cluster communicatively coupled to interface with the sensor device 102 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from the sensor device 102 and/or the storage device 106. The controller device 110 may also or alternatively comprise a plurality of electronic processing devices located at one or more various sites and/or locations (e.g., a distributed computing and/or processing network) such as the storage device 106. In some embodiments, the controller device 110 may comprise a mobile and/or hand-held computerized device such as a smart phone, a GPS device, and/or a vehicle computer.

According to some embodiments, the controller device 110 may store and/or execute specially-programmed instructions to operate in accordance with embodiments described herein. The controller device 110 may, for example, execute one or more programs that facilitate and/or cause the automatic detection, verification, data capture, and/or data analysis (e.g., cargo status analysis) of the storage device 106 and/or the objects 108a-n, as described herein. According to some embodiments, the controller device 110 may comprise a computerized processing device, such as a PC, laptop computer, computer server, and/or other network or electronic device, operated to manage and/or facilitate cargo analysis and/or trailer safety measure implementations in accordance with embodiments described herein.

In some embodiments, the controller device 110 and/or the sensor device 102 (and/or one or more of the objects 108a-n) may be in communication with the memory device 140. The memory device 140 may store, for example, cargo data, shipping data, location data (such as coordinates, distances, etc.), security access protocol and/or verification data, vehicle data, object classification data, scoring data, cargo status analysis and/or assessment data and/or logic (such as cargo status rules), and/or instructions that cause various devices (e.g., the controller device 110, the sensor device 102, and/or one or more of the objects 108a-n) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store data descriptive of the objects 108a-n, device identifier data, user identifier data, data descriptive of the storage device 106, AI logic and/or training data, image (and/or other sensor data) analysis data, image (and/or other sensor data) processing data, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD extended-Capacity (SDXC), and any various practicable form-factors, such as original, mini, and micro sizes, such as those available from Western Digital Corporation of San Jose, CA). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the sensor device 102 and/or the controller device 110 (and/or one or more of the objects 108a-n) may comprise the memory device 140 or a portion thereof, for example.

Figure 2:
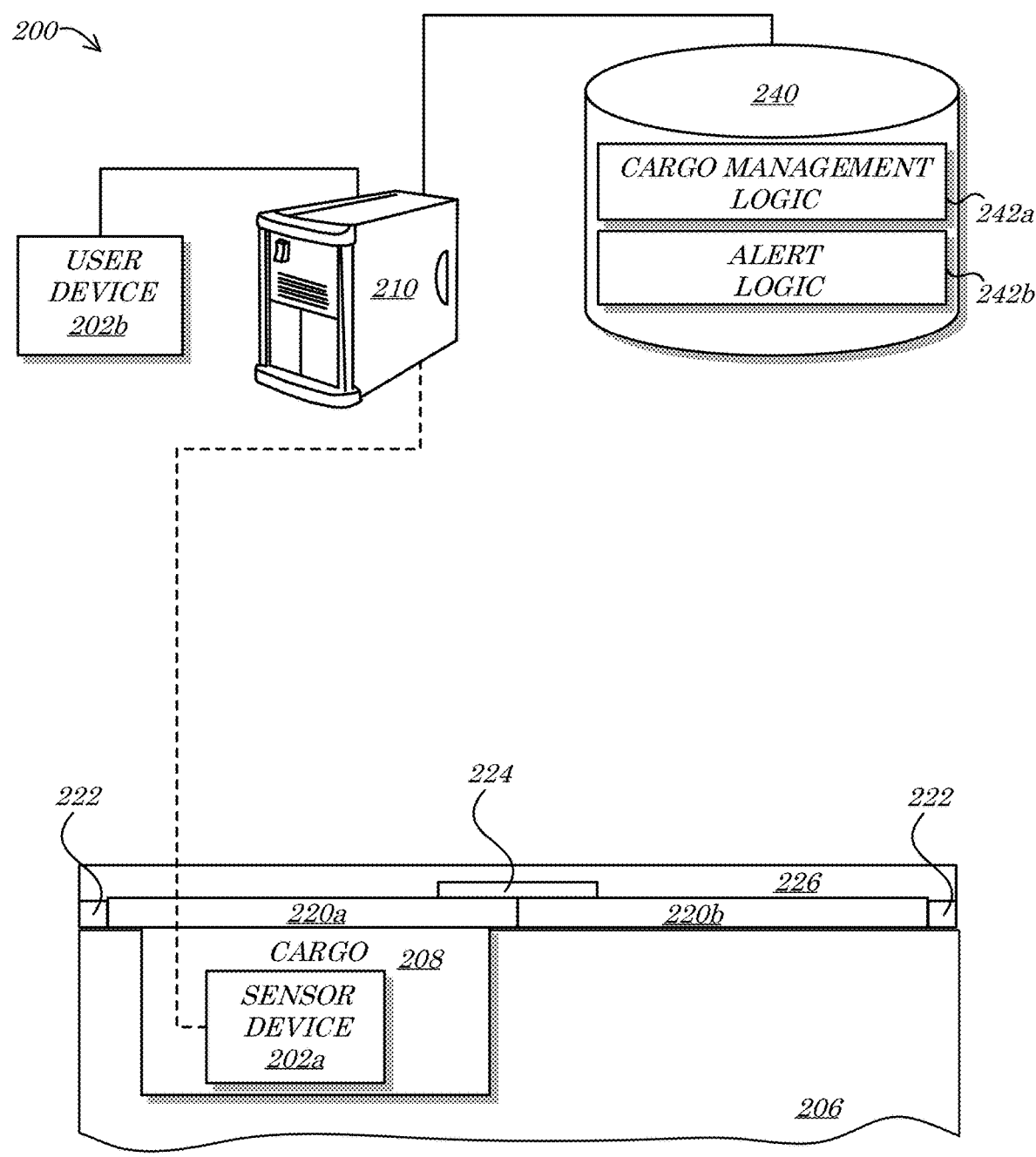
FIG. 2 is a block diagram of a system according to some embodiments.

Turning to FIG. 2, a diagram of a system 200 according to some embodiments is shown. In some embodiments, the system 200 may comprise a trailer safety system similar to the system 100 of FIG. 1 herein. The system 200 may comprise, for example, one or more user or sensor devices 202a-b disposed to capture data descriptive of a trailer 206 (or other storage area or device) and/or cargo 208. The cargo 208 may, for example, comprise one or more boxes and/or pallets stacked and/or otherwise disposed within the trailer 206. According to some embodiments, a trailer sensor 202a (and/or a user device 202b) may be in communication with a server 210. The server 210 may, in some embodiments, receive (and solicit) data from the trailer sensor 202a, store the data in a memory device 240, and/or execute one or more sets of instructions 242a-b (e.g., cargo management logic 242a and/or alert logic 242b) stored in the memory device 240 to cause an alert to be output by the user device 202b or by another method and/or device as described herein in the case that the cargo 208 has attained an unsafe and/or undesirable status.

In some embodiments, the trailer 206 may restrain, hold, and/or contain the cargo 208 via one or more doors 220a-b. The doors 220a-b may be selectively opened and closed, for example, to permit the cargo to be selectively loaded or unloaded from the trailer 206. While the doors 220a-b may comprise any type or quantity of access and/or securing devices that are or become known or practicable, as depicted in FIG. 2, the doors 220a-b may comprise cooperatively out-swinging doors 220a-b that are coupled to swing outward (e.g., away from the cargo 208) about respective hinges 222. According to some embodiments, the doors 220a-b may be secured and/or locked via a lock mechanism 224. In some embodiments, the lock mechanism 224 may be engaged to selectively hold the doors closed by coupling the free ends of the doors 220a-b together or to the frame of the trailer 206 in a closed, secured, and/or locked state, for example, and/or may be disengaged to permit the doors 220a-b to swing freely. In some embodiments, the lock mechanism 224 may couple one or more of the doors 220a-b to a bumper or trailer deck 226 (as is common with many cargo trailers).

According to embodiments, the sensor device 202a may comprise an RFID, accelerometer, and/or other motion aware and/or motion sensing device coupled to the cargo 208. In such a manner, for example, movement of the cargo 208 may be tracked and reported to the server 210. The server 210 may execute the cargo management logic 242a, in some embodiments, utilizing the movement data from the sensor 202a as input and computing a cargo status assessment result. Different types of cargo 208 may be associated with different pre-stored and pre-defined rules encoded in the cargo management logic 242a, for example, and the movement data may be compared to and/or analyzed with respect to the rules to determine whether the cargo is within acceptable movement parameters. Acceptable movement parameters may comprise, for example, an absolute and/or relative position, an amount of movement, a rate of movement, an angle and/or orientation, and/or a magnitude and/or frequency of vibration.

In some embodiments, the sensor device 202a may also or alternatively comprise a camera that is coupled to include the cargo 208 in a field of view thereof. The server 210 may execute the cargo management logic 242a, for example, utilizing the image data to derive movement and/or orientation metrics therefrom. According to some embodiments, the sensor device 202a may also or alternatively comprise a pressure and/or strain sensor coupled to one or more of the doors 220a-b, the hinges 222, and/or the lock mechanism 224. The sensor device 202a may measure (e.g., constantly or at intervals) pressure and/or strain on the doors 220a-b, the hinges 222, and/or the lock mechanism 224, for example, to infer a status of the cargo 208. The cargo management logic 242a may comprise, in some embodiments, pre-stored and pre-defined rules defining one or more pressure and/or strain thresholds and/or ranges that are acceptable. Measurements outside of the acceptable thresholds and/or ranges may be identified as cargo alert conditions that are indicative of the cargo 208 having shifted such that the weight of the cargo 208 is being applied to the doors 220a-b, the hinges 222, and/or the lock mechanism 224.

According to some embodiments, in the case that a cargo alert condition is identified (e.g., based on an execution of the cargo management logic 242a by the server 210) the system 200 may (i) transmit and/or output an alert, (ii) activate a safety mechanism (not separately shown), and/or (iii) activate a remediation mechanism. Upon alert detection, for example, the server 210 may execute the alert logic 242b to identify a type, quantity, magnitude, frequency, and/or timing of an alert. In some embodiments, a warning light (not shown) on the trailer 206 and/or in a tractor (not shown) coupled thereto may be activated and/or an electronic audible warning may be output via a sounder device (such as a siren or speaker; also not shown) and/or via the user device 202b. According to some embodiments, different alerts may be output for different types of cargo 208 and/or for different types of cargo alert conditions.

In some embodiments, the system 200 may activate and/or control one or more of the hinges 222 and the lock mechanism 224 in response to an alert condition. Either or both of the hinges 222 and the lock mechanism 224 may comprises electromechanical devices, for example, that may be engaged, disengaged, locked, unlocked, and/or moved in response to commands sent by the server 210. The server 210 may, for example, increase a tension (e.g., torsion) of one or more of the hinges 222, making it more difficult for the cargo 208 to be capable of causing the doors 220a-b to open in an unsafe (e.g., quick) manner. In some embodiments, the server 210 may command the lock mechanism 224 to engage, e.g., as an override to an operator's manual operation thereof. According to some embodiments, one or more safety features such as pins, clamps, and/or straps (not shown) may be automatically deployed and/or engaged by the system 200 in response to an alert condition. In such a manner, for example, the operator will become aware of an issue with the cargo 208 and/or be safeguarded from potential injury, before the operator attempts to open the doors 220a-b.

In some embodiments, the system 200 may control one or more devices (not necessarily separately shown) to remediate a cargo alert event. In the case that the cargo 208 comprises one or more actuatable devices such as motors, pistons, and/or solenoids, for example, such devices may be controlled by the system 200. In the case that the sensor device 202a detects a deviation of the cargo 208 from an acceptable angle of incline (e.g., a tipping condition), for example, the server 210 may send a command (e.g., as a particular type of alert) to a leveling device (not shown) coupled to the cargo 208. The system 200 may, for example, automatically set the cargo 208 right to counteract any negative readings/alert conditions. In some embodiments, such as in the case that the trailer 206 comprises and/or is coupled to a vehicle, the system 200 may send control commands to the vehicle (e.g., in the case that the server 210 comprises a vehicle computer, to the server 210) to affect vehicle movement to counteract negative readings from the sensor device 202a. In the case that the sensor device 202a comprises a pressure sensor coupled to a first door 220a and detects a pressure indicting that the cargo 208 has moved up against the first door 220a, for example, the server 210 may instruct the vehicle/trailer 206 to change and/or obtain one or more operational settings that apply forces on the cargo 208 to urge the cargo 208 away from the first door 220a. The trailer 206 may adjust a suspension (e.g., air suspension) settings and/or other tilt settings to tilt the trailer 206 away from the first door 220a, for example, and/or the vehicle may execute a braking maneuver that may force the cargo 208 to slide forward (e.g., away from the doors 220a-b, assuming the doors 220a-b are in the rear).

Fewer or more components 202a-b, 206, 208, 210, 220a-b, 222, 224, 226, 240, 242a-b and/or various configurations of the depicted components 202a-b, 206, 208, 210, 220a-b, 222, 224, 226, 240, 242a-b may be included in the system 200 without deviating from the scope of embodiments described herein. In some embodiments, the components 202a-b, 206, 208, 210, 220a-b, 222, 224, 226, 240, 242a-b may be similar in configuration and/or functionality to similarly named and/or numbered components as described herein. In some embodiments, the system 200 (and/or portions thereof) may comprise an automatic trailer door safety alert and/or restraining program, system, and/or platform programmed and/or otherwise configured to execute, conduct, and/or facilitate various methods such as the method 400 of FIG. 4 herein.

Figure 3A:
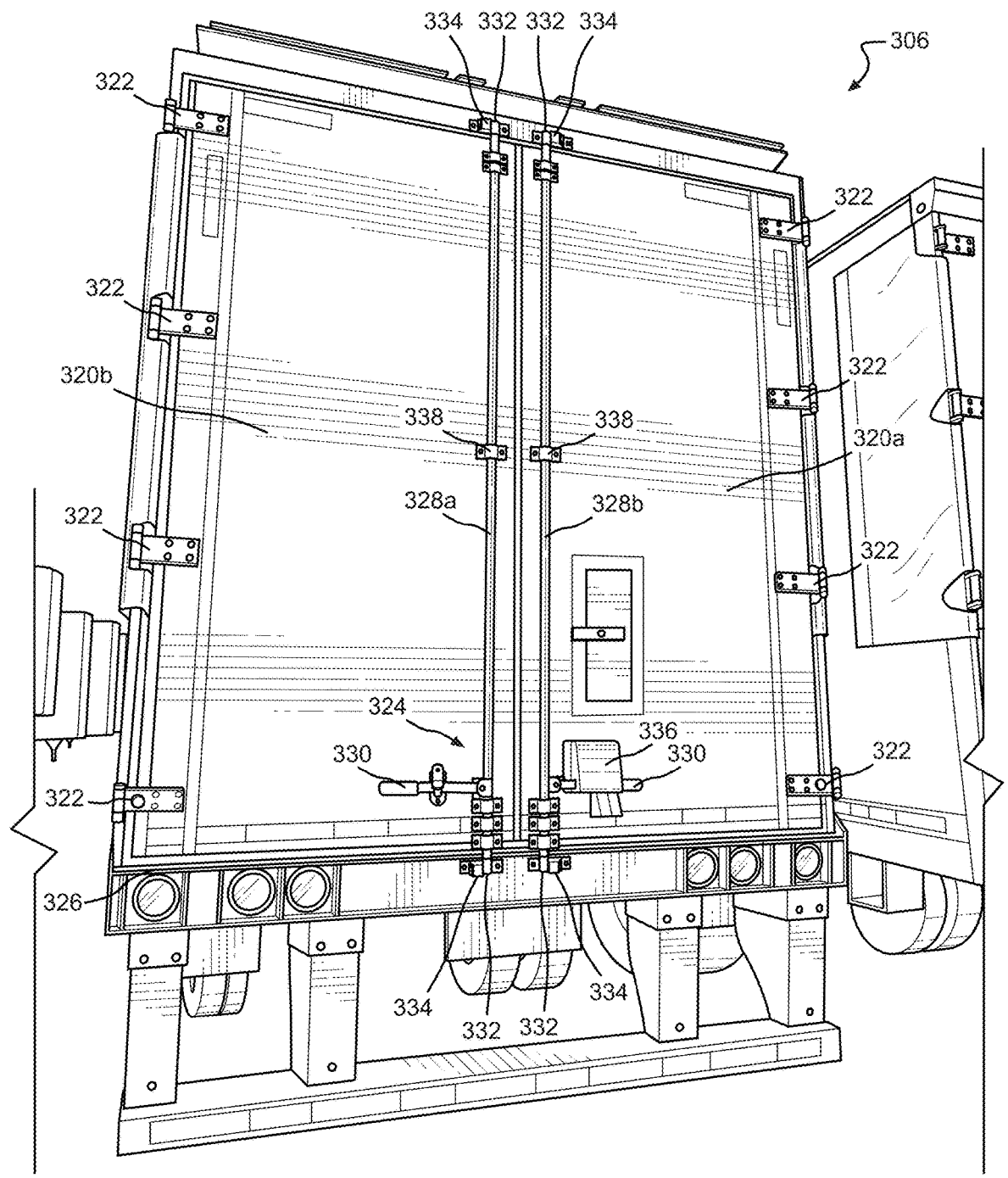
FIG. 3A, FIG. 3B, FIG. 3C, and FIG. 3D are various views of a system according to some embodiments.
Figure 3B:
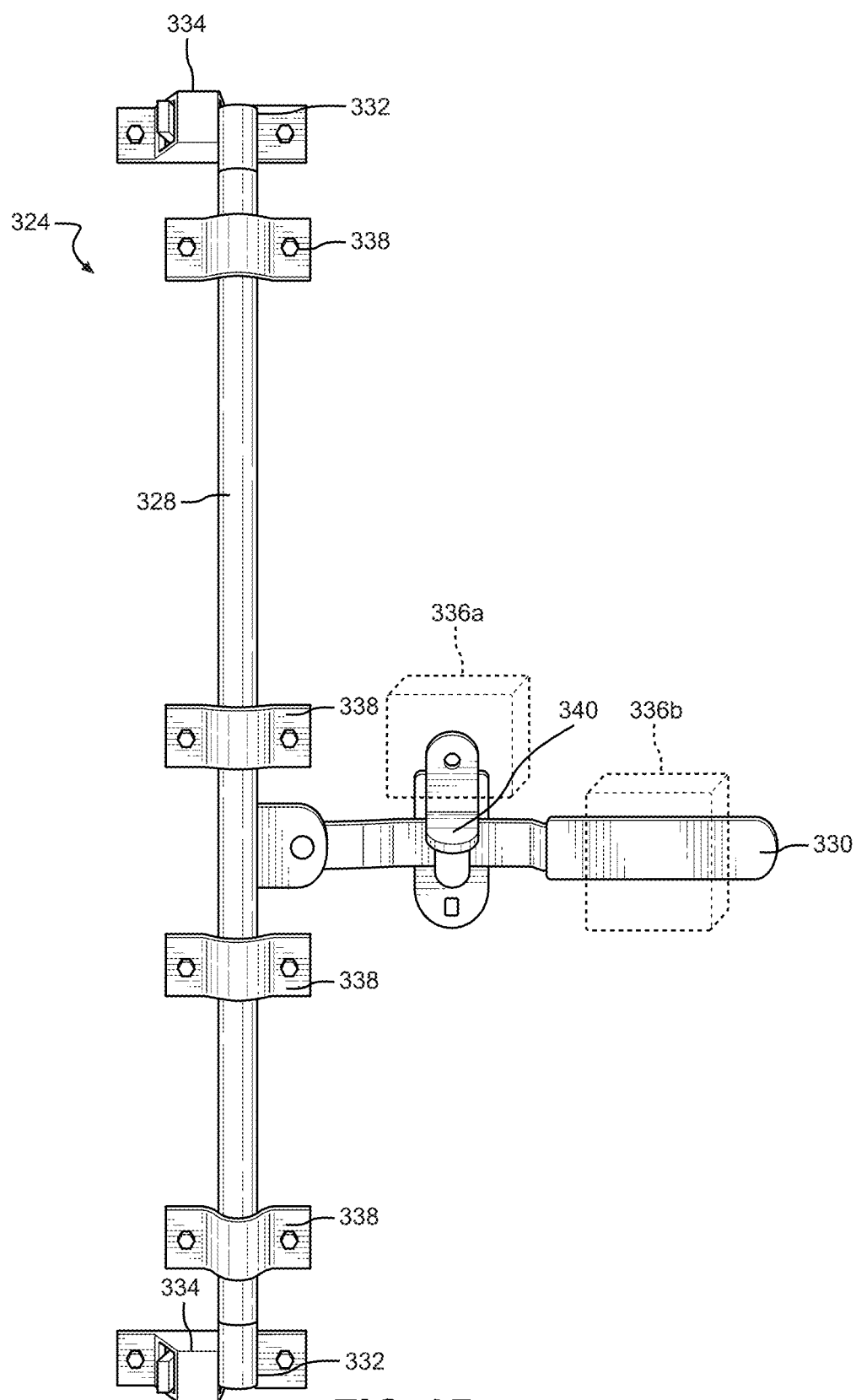
Figure 3C:
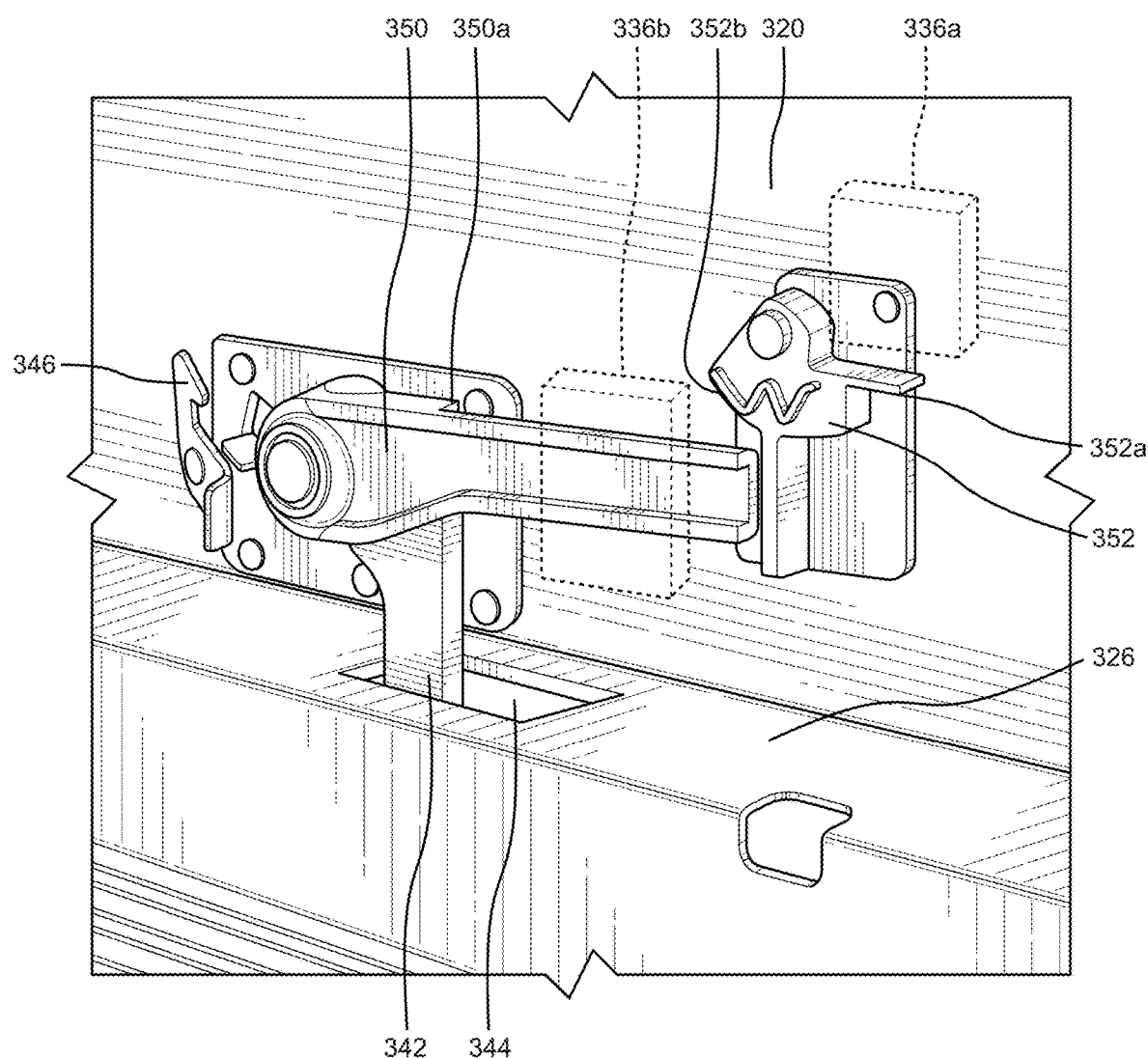

In some embodiments as depicted in FIG. 3A, FIG. 3B, FIG. 3C, and FIG. 3D, a system 300 may comprise a storage device such as a trailer 306 that may restrain, hold, and/or contain cargo (not shown) via a door 320 (e.g., in some embodiments a single door as depicted in FIG. 3C or a pair of doors 320a-b as depicted in FIG. 3A). The door 320 may be selectively opened and closed, for example, to permit the cargo to be selectively loaded or unloaded from the trailer 306. In some embodiments, the door 320 may open to the side about hinges 322 as shown in FIG. 3A or roll upwards on a sliding mechanism like the door 320 shown in FIG. 3C.

In some embodiments, the door 320 may be secured and/or locked via a lock mechanism 324. The lock mechanism 324 may be engaged to selectively couple the free end of the door 320 in a closed, secured, and/or locked state, for example, and/or may be disengaged to permit the door 320 to open freely. FIG. 3B depicts one type of lock mechanism 324 in accordance with some embodiments. In some embodiments, the door 320 may be held shut by the lock mechanism 324 that includes a shaft, rod, or pipe 328 (e.g., that may be disposed on each of the doors 320a-b in an embodiment) distal from the hinges 322 and reaches from and extends slightly past the top and bottom of the door 320 and may be rotatably held on the door 320 by one or more retainers 338. In an embodiment, the pipe 328 may include a lug 332 at a top and/or bottom of the pipe 328. The lug 332 may rotatably fit within a keeper 334 associated with each lug 332 that is fixed to a frame of the trailer 306 above and below the door 320. In some embodiments, the keeper 334 may be shaped such that the lug 332 rotatably fits within the keeper 334 and prevents the door 320 from opening but allows the lug 332 to rotate out of contact with the keeper 334 to selectively allow the door 320 to open. In an embodiment, a pipe handle 330 may be attached to the pipe 328 at a convenient location reachable by a user standing on the ground adjacent to the door 320 to allow the user to grab the pipe handle 330 and rotate the pipe 328 within the retainer 338 to rotate the lug 332 out of contact with the keeper 334 (e.g., as depicted in FIG. 3A, the pipe handle 330 on the door 320a rotates away from the door 320a which in turn rotates the pipe 328a and the lugs 332 on either end of the pipe 328a). In an embodiment, the pipe handle 330 may fit within a hasp 348 that initially prevents the handle 330 from rotating but may be rotated and/or otherwise relocated out of the path of the handle 330 to allow rotation of the handle 330, the pipe 328, and the lug 332 to allow selective opening of the door 320.

As shown in FIG. 3C, in some embodiments, the door 320 may be a single door 320 that slides open upwardly. The door 320 may include a handle 330 that includes a lock hook 342 (e.g., a lock mechanism 324) rotatably attached. In an embodiment, the lock hook 342 may fit within a lock aperture 344 in the trailer deck 326. An end of the handle 350 may be held in place and/or prevented from freely rotating to an unlocked position by a hasp 352. The hasp 352 initially prevents the handle from rotating but may be rotated and/or otherwise relocated out of the path of the handle 350 by manipulating the surface 352a upwardly and moving stop surface 352b out of the way of and allowing rotation of the handle 350 and removal of the lock hook 342 from contact with the trailer deck 326 to allow selective opening of the door 320. In an embodiment, the handle 350 may include a striker 350a that is held by a hook 346 when the handle 350 is in the open position to prevent the handle 350 from rotating into the closed position. In an embodiment, a user rotates the hasp 352 by pushing upwardly on the surface 352a which moves surface 352b out of the way of the end of handle 350. The handle 350 may then rotate (e.g., counter-clockwise as shown in FIG. 3C) pulling the lock hook 342 out of the lock aperture 344. The door 320, which may include a counterweight (not shown) may then slide upwardly allowing access to the interior of the trailer 306.

In some embodiments (as depicted in FIG. 3A), an alert mechanism 336 may be attached to an element of the locking mechanism 324 (e.g., the alert mechanism 336 may be attached to the handle 330, the hasp 352, the lock hook 342, or another element which prevents the user from opening the door 320). In some embodiments, the alert mechanism 336 may be directly or indirectly wirelessly coupled to a cargo alert system (not separately shown) similar to the systems of FIG. 1 and FIG. 2 herein. Such a system may comprise, for example, one or more user or sensor devices disposed to capture data descriptive of a trailer 306 (or other storage area or device) and/or cargo within the trailer 306. The cargo may, for example, comprise one or more boxes and/or pallets stacked and/or otherwise disposed within the trailer 306. According to some embodiments, a trailer sensor (and/or a user device) may be in communication with a controller (not depicted in these figures). The controller may, in some embodiments, receive (and solicit) data from the trailer sensor, store the data in a memory device (also not depicted in these figures), and/or execute one or more sets of instructions (e.g., cargo management logic and/or alert logic) stored in the memory device to cause an alert to be output to the operator by the user device and/or via the alert mechanism 336 (e.g., a warning light on the door 320 visible to the user in proximity of the door 320, a speaker that emits a noise that is audible to a user in proximity of the door 320, and/or a personal user device such as a phone or other portable electronic device that vibrates such that it is felt by a user in proximity of the door 320) in the case that the system has determined that the cargo has attained an unsafe and/or undesirable status. In some embodiments (as depicted in FIG. 3C), an alert mechanism 336a may be placed on the hasp 352 to prevent the hasp from rotating and allowing the handle 350 to rotate into the open position. In still other embodiments, an alert mechanism 336b may be placed directly onto the handle 350 to prevent the handle 350 from opening.

According to embodiments, the sensor device may comprise an RFID, accelerometer, and/or other motion aware and/or motion sensing device coupled to the cargo. In such a manner, for example, movement of the cargo may be tracked and reported to the controller. The controller may execute the cargo management logic, in some embodiments, utilizing the movement data from the sensor as input and computing a cargo status assessment result. Different types of cargo may be associated with different pre-stored and pre-defined rules encoded in the cargo management logic, for example, and the movement data may be compared to and/or analyzed with respect to the rules to determine whether the cargo is within acceptable movement parameters. Acceptable movement parameters may comprise, for example, an absolute and/or relative position, an amount of movement, a rate of movement, an angle and/or orientation, and/or a magnitude and/or frequency of vibration.

In some embodiments, the sensor device may also or alternatively comprise a camera that is configured to include the cargo in a field of view thereof. The controller may execute the cargo management logic, for example, utilizing the image data from the sensor to derive movement and/or orientation metrics therefrom. According to some embodiments, the sensor device may also or alternatively comprise a pressure and/or strain sensor coupled to the door(s) 320, the hinges 322, and/or the lock mechanism 324. The sensor device may measure (e.g., constantly or at intervals) pressure and/or strain on the door(s) 320, the hinges 322, and/or the lock mechanism 324, for example, to infer a status of the cargo. The cargo management logic may comprise, in some embodiments, pre-stored and pre-defined rules defining one or more pressure and/or strain thresholds and/or ranges that are acceptable. Measurements outside of the acceptable thresholds and/or ranges may be identified as cargo alert conditions that are indicative of the cargo having shifted such that the weight of the cargo is being applied to the door(s) 320, the hinges 322, and/or the lock mechanism 324.

According to some embodiments, in the case that a cargo alert condition is identified (e.g., based on an execution of the cargo management logic by the controller) such a system may (i) transmit and/or output an alert, (ii) activate a safety mechanism (e.g., the alert mechanism 336), and/or (iii) activate a remediation mechanism. Upon alert detection, for example, the controller may execute the alert logic to identify a type, quantity, magnitude, frequency, and/or timing of an alert. In some embodiments, a user device perceivable by a user in proximity to the door 320, such as the alert mechanism 336, may issue a warning the user. For example, a warning light on the user device and/or alert mechanism 336 on the door 320 (as shown in FIG. 3A, FIG. 3B, FIG. 3C, and FIG. 3D), the trailer 306 and/or in a tractor (not shown) coupled thereto may be activated and/or an electronic audible warning may be output via the user device and/or alert mechanism 336 (such as a siren or speaker) and/or lights, audible warnings, or vibrations via a personal user device on the user. According to some embodiments, different alerts may be output for different types of cargo and/or for different types of cargo alert conditions.

In some embodiments, the system 300 may activate and/or control one or more of the hinges 322 and/or the lock mechanism 324 in response to an alert condition. One or more of the hinges 322 and/or the lock mechanism 324 may comprise electromechanical devices, for example, that may be engaged, disengaged, locked, unlocked, and/or moved remotely in response to commands sent by the controller. The controller may, for example, increase a tension (e.g., torsion) of one or more of the hinges 322, making it more difficult for the cargo to be capable of causing the door 320 to open in an unsafe (e.g., quick) manner. In some embodiments, the controller may command the lock mechanism 324 to engage, e.g., as an override to an operator's manual operation thereof.

Figure 3D:
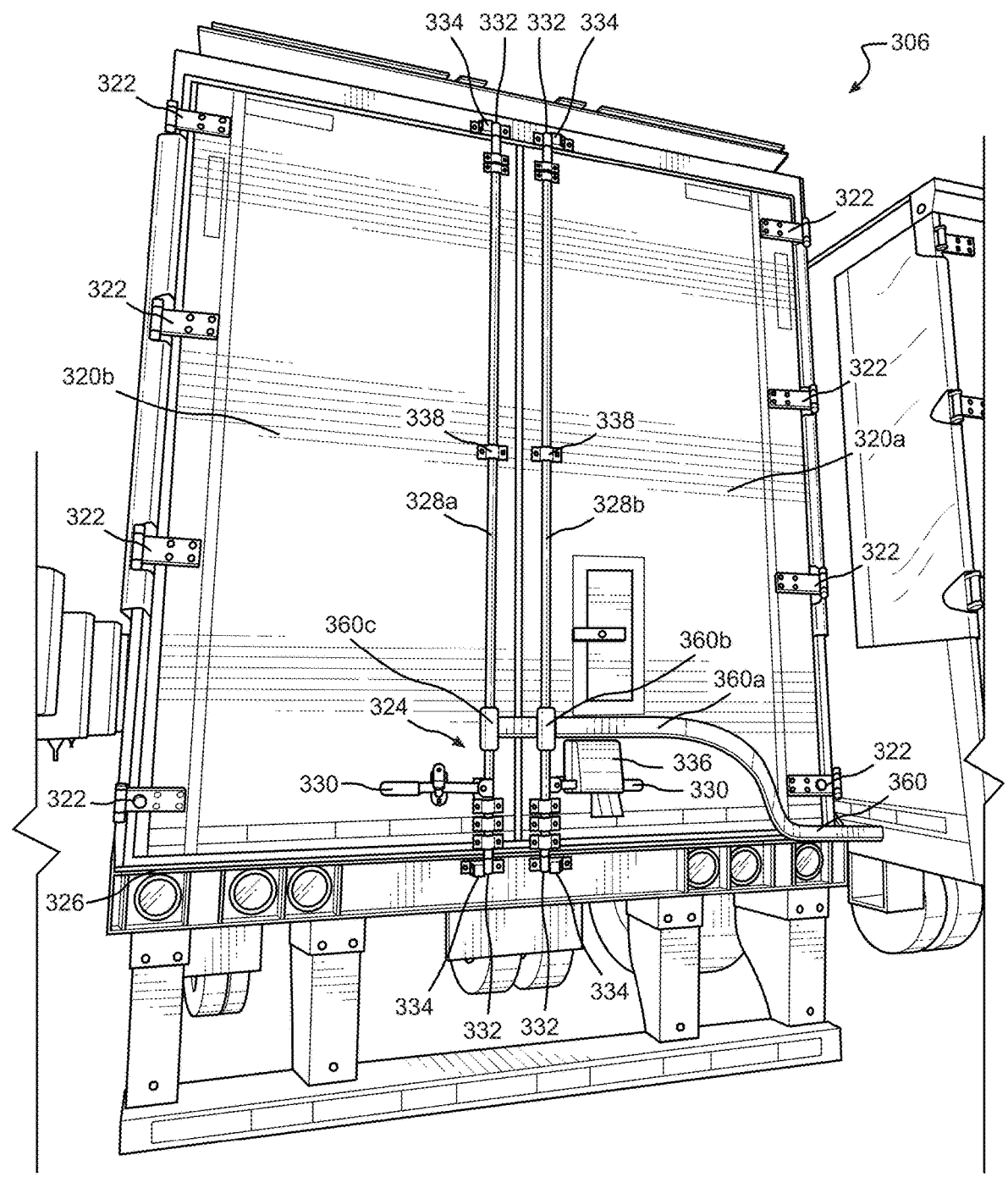

According to some embodiments, one or more safety features such as pins, clamps, straps, winch, and/or other arresting devices 360 as shown in FIG. 3D (as depicted the arresting device of FIG. 3D is a strap and winch combination, but it should be known that other arresting devices 360 may be employed such as a remotely controllable arresting device 360 attached to pipes 328a-b whereby the operator may remotely control the holding force of the arresting device 360 to prevent the doors 320a-b from rapidly opening) may be automatically or manually deployed and/or engaged by the system 300 in response to an alert condition. The winch 360 may include a strap 360a routed between at least two winch elements 360b-c attached to e.g. pipes 328a-b, at least one of which may be actuatable from a safe distance (e.g. by manipulating the strap 360a in certain directions may lock or release winch element 360b) which allows the door(s) 320 to be opened without standing the path of the door(s) 320 or the cargo within that may fall out of the trailer 306. In some embodiments, a user may verify on the alert mechanism 336 that a safety instruction has been followed, thereby releasing the alert mechanism 336 to allow the door 320 to be opened (e.g. depressing a button (not separately depicted in the figures) on the alert mechanism 336 verifying that either (i) there is no alert, or (ii) that the safety instruction generated by the system 300 has been followed and the door 320 may be opened in a safe manner). In such a manner, for example, the operator will become aware of an issue with the cargo and/or be safeguarded from potential injury, before the operator attempts to open the door 320.

Fewer or more components 306, 320a-b, 322, 326, 328a-b, 330, 332, 334, 336a-b, 338, 344, 352, 352a-b, 350, 360, 360a-c and/or various configurations of the depicted components 306, 320a-b, 322, 326, 328a-b, 330, 332, 334, 336a-b, 338, 344, 352, 352a-b, 350, 360, 360a-c may be included in the system 300 without deviating from the scope of embodiments described herein. In some embodiments, the components 306, 320a-b, 322, 326, 328a-b, 330, 332, 334, 336a-b, 338, 344, 352, 352a-b, 350, 360, 360a-c may be similar in configuration and/or functionality to similarly named and/or numbered components as described herein. In some embodiments, the system 300 (and/or portions thereof) may comprise an automatic trailer door safety alert and/or restraining program, system, and/or platform programmed and/or otherwise configured to execute, conduct, and/or facilitate various methods such as the method 400 of FIG. 4 herein.

According to some embodiments, the trailer 306 may comprise any location, device, machine, and/or other object capable of containing, carrying, housing, moving, and/or transporting one or more cargo objects. The trailer 306 may comprise, for example, a room, a trailer, a storage tank, a storage and/or shipping container, ship, truck, aircraft (and/or cargo hold thereof), and/or train. In some embodiments, the trailer 306 may be identified by one or more location parameters, such as an address, postal code, map quadrant, a particular building and/or structure, a room, and/or one or more coordinates and/or other identifiers (e.g., a unique geo-referenced location identifier such as latitude and longitude coordinates and/or a Global Positioning System (GPS) coordinate). According to some embodiments, the trailer 306 may comprise the one or more cargo objects. In the case that the trailer 306 comprises a shipping container or trailer, for example, the cargo objects may comprise various items of cargo such as boxes, crates, pallets, drums, etc. According to some embodiments, the trailer 306 may be identified by a unique identifier and/or code that is stored in relation to (e.g., creating a stored link with) the cargo objects.

III. Methods of Using Trailer Door Safety Systems

Figure 4:
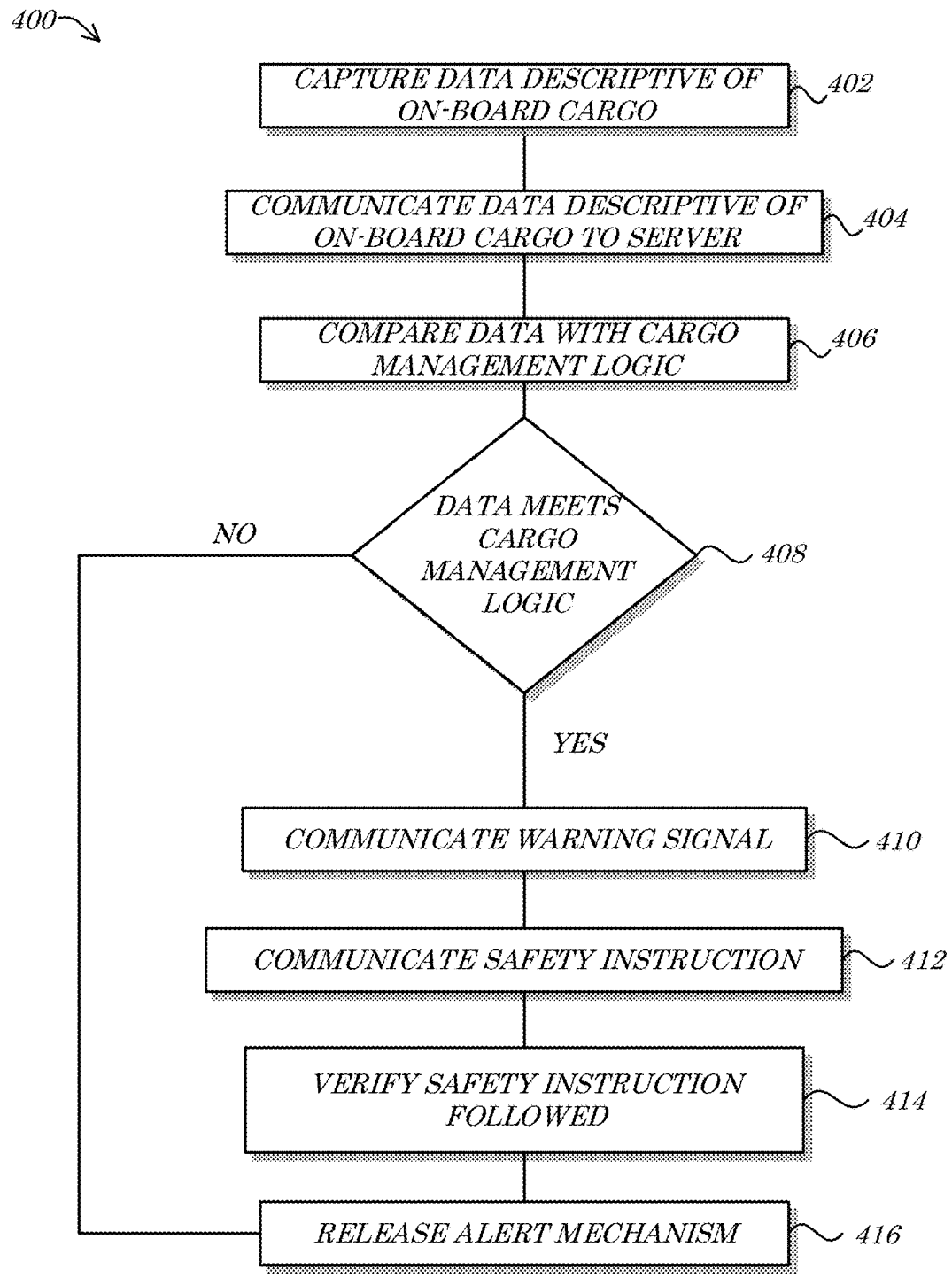
FIG. 4 is a flow diagram of a method according to some embodiments.

Turning to FIG. 4, a flow diagram of a method 400 according to some embodiments is shown. In some embodiments, the system of the method 400 described below may comprise a trailer safety system similar to the systems 100, 200, and/or 300 of FIG. 1, FIG. 2, FIG. 3A, FIG. 3B, FIG. 3C, and/or FIG. 3D herein and/or otherwise may be associated with one or more of the controller devices 110, 210 in conjunction with one or more of the sensors 102, 202 and alert mechanisms 336a-b.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); (e.g., the memory/data devices 140 and/or 240 of FIG. 1 and/or FIG. 2 herein) may store thereon instructions that when executed by a machine (such as a computerized processor) result in performance according to any one or more of the embodiments described herein.

In some embodiments, the method 400 may comprise capturing data descriptive of on-board cargo, at 402. A sensor device on and/or within a storage device such as a trailer may, for example, detect data descriptive of a state of at least one object (e.g., a unit of cargo) within the trailer. According to some embodiments, the sensor device may comprise an RFID, accelerometer, and/or other motion aware and/or motion sensing device coupled to the cargo. In some embodiments, the sensor device may comprise, for example, a camera and/or a ranging device such as a Light Detection and Ranging (LiDAR) device. In some embodiments, the sensor device may comprise a multispectral imaging device capable of capturing three or four band imagery data (e.g., RGB plus Near IR). The imagery and/or other data captured by the sensor device may generally comprise any type, quantity, and/or format of digital, analog, photographic, video, pressure, light, strain, and/or other sensor data descriptive of the storage device and/or the cargo objects thereof. According to some embodiments, the data captured and/or acquired by the sensor device may comprise one or more images captured from different positions and/or locations in or proximate to the storage device and/or the objects, such as a plurality of individual images taken at different bearings from a given position and/or a single panoramic image taken from the given position. According to some embodiments, the sensor device may also or alternatively comprise a pressure and/or strain sensor coupled to one or more of the doors, the hinges, and/or the lock mechanism of the trailer. The sensor device may measure (e.g., constantly or at intervals) pressure and/or strain the doors, hinges, and/or a lock mechanism of the trailer, for example, to infer a status of the cargo. In such a manner, at 404 for example, the movement of the cargo may be identified, recorded, tracked, and then reported to the server.

In some embodiments, the method 400 may comprise comparing the data with cargo management logic, at 406. The server may execute cargo management logic at 406, for example, utilizing the movement data or other cargo-related data from the sensor as input and computing a cargo status assessment result. Different types of cargo may be associated with different pre-stored and pre-defined rules encoded in the cargo management logic, for example, and the movement data may be compared to and/or analyzed with respect to the rules to determine whether the cargo is within acceptable movement parameters. Acceptable movement parameters may comprise, for example, an absolute and/or relative position, an amount of movement, a rate of movement, an angle and/or orientation, and/or a magnitude and/or frequency of vibration. The cargo management logic may comprise, in some embodiments, pre-stored and pre-defined rules defining one or more pressure and/or strain thresholds and/or ranges that are acceptable. Measurements outside of the acceptable thresholds and/or ranges may be identified as cargo alert conditions that are indicative of the cargo having shifted such that the weight of the cargo is being applied to the doors, the hinges, and/or the lock mechanism of the trailer. In some embodiments, the method 400 may use the cargo management logic to determine whether the received data from the sensor(s) meets the cargo alert condition, at 408.

According to some embodiments, in the case a cargo alert condition is not identified, the method 400 may proceed to 416 and allow (e.g., trigger, command, and/or actuate or disengage) the alert mechanism attached to the trailer lock mechanism to release, allowing a user to open the doors and begin the normal cargo removal process. According to some embodiments, in the case that a cargo alert condition is identified (e.g., based on an execution of the cargo management logic by the server) the method 400 may (i) transmit and/or output an alert, (ii) activate a safety mechanism (e.g., the alert mechanism attached to the trailer lock mechanism), and/or (iii) activate a remediation mechanism. Upon alert detection, for example, the server may execute the alert logic to identify a type, quantity, magnitude, frequency, and/or timing of an alert. In some embodiments, a warning light on the trailer and/or in a tractor coupled thereto may be activated and/or an electronic audible warning may be output via a sounder device and/or via a user device, at 410. According to some embodiments, different alerts may be output for different types of cargo and/or for different types of cargo alert conditions.

According to some embodiments, the method 400 may comprise outputting a safety instruction, at 412. The safety instruction (e.g., a message on the operator's personal device or to a controller on the trailer, in the tractor, and/or within the facility) may be communicated, for example, to the operator to perform at least one remediation step before the alert mechanism releases the trailer lock mechanism. For example, an instruction may be communicated to the operator to install a strap or winch to the door to (i) allow the operator to open the door from a distance away from the trailer opening and/or (ii) open the door slowly such that the door does not open at a dangerously high speed. In some embodiments, the method may comprise verifying that the instruction has been followed, at 414. The operator may provide input that the instruction has been met or followed, e.g., by clicking a button or some alternative or additional mechanism on the alert mechanism, touching a button on the operator's personal device, or clicking a button on the controller. In some embodiments, the verification step may be accomplished automatically, e.g., an arresting mechanism may have a wireless or wired, direct or indirect connection to the server and on-board sensor(s) that communicate to the server that the arresting mechanism is (i) in place and/or (ii) properly configured to prevent the door from opening dangerously. Once the at least one remediation step has been verified complete, either automatically, by the operator, or another user in the area, the method 400 may comprise releasing the alert mechanism at 416, allowing the operator to facilitate opening the door of the trailer in the normal process.

IV. Controller in Use with the Trailer Door Safety Systems

Figure 5:
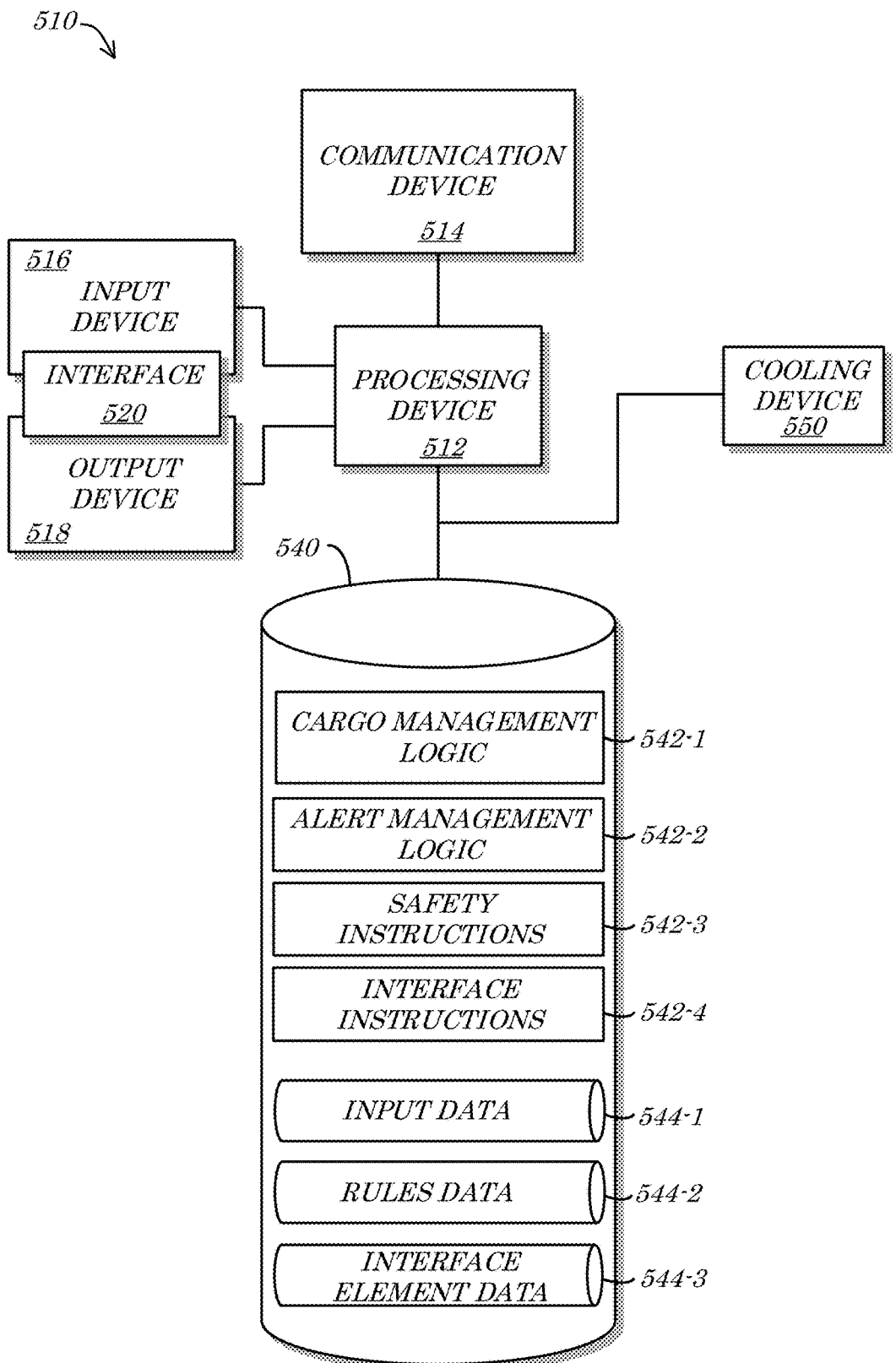
FIG. 5 is a block diagram of a controller according to some embodiments.

Turning to FIG. 5, a block diagram of an apparatus 510 according to some embodiments is shown. In some embodiments, the apparatus 510 may be similar in configuration and/or functionality to one or more of the controller devices 110, 210, of FIG. 1 and/or FIG. 2 herein, and/or in conjunction with the system 300 of FIG. 3A-D. In some embodiments, the apparatus 510 may, for example, execute, process, facilitate, and/or otherwise be associated with the method 400 of FIG. 4 herein, and/or portions. In some embodiments, the apparatus 510 may comprise a processing device 512, a communication device 514, an input device 516, an output device 518, an interface 520, a memory device 540 (storing various programs and/or instructions 542 and data 544), and/or a cooling device 550. According to some embodiments, any or all of the components 512, 514, 516, 518, 520, 540, 542, 544, 550 of the apparatus 510 may be similar in configuration and/or functionality to any similarly named and/or numbered components described herein. Fewer or more components 512, 514, 516, 518, 520, 540, 542, 544, 550 and/or various configurations of the components 512, 514, 516, 518, 520, 540, 542, 544, 550 may be included in the apparatus 510 without deviating from the scope of embodiments described herein.

According to some embodiments, the processor 512 may be or include any type, quantity, and/or configuration of processor that is or becomes known. The processor 512 may comprise, for example, an Intel® IXP 2800 network processor or an Intel® XEON™ Processor coupled with an Intel® E7501 chipset. In some embodiments, the processor 512 may comprise multiple interconnected processors, microprocessors, and/or micro-engines. According to some embodiments, the processor 512 (and/or the apparatus 510 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 510 comprises a server, such as a blade server, necessary power may be supplied via a standard AC outlet, power strip, surge protector, and/or Uninterruptible Power Supply (UPS) device.

In some embodiments, the communication device 514 may comprise any type or configuration of communication device that is or becomes known or practicable. The communication device 514 may, for example, comprise a Network Interface Card (NIC), a telephonic device, a cellular network device, a router, a hub, a modem, and/or a communications port or cable. In some embodiments, the communication device 514 may be coupled to receive user input data, e.g., from a user device (not shown in FIG. 5). The communication device 514 may, for example, comprise a Bluetooth® Low Energy (BLE) and/or RF receiver device and/or a camera or other imaging device that acquires data from a user (not separately depicted in FIG. 5) and/or a transmitter device that provides the data to a remote server and/or server or communications layer (also not separately shown in FIG. 5). According to some embodiments, the communication device 514 may also or alternatively be coupled to the processor 512. In some embodiments, the communication device 514 may comprise an infrared (IR), RF, Bluetooth™, Near-Field Communication (NFC), and/or Wi-Fi® network device coupled to facilitate communications between the processor 512 and another device (such as a remote user device, not separately shown in FIG. 5).

In some embodiments, the input device 516 and/or the output device 518 are communicatively coupled to the processor 512 (e.g., via wired and/or wireless connections and/or pathways) and they may generally comprise any types or configurations of input and output components and/or devices that are or become known, respectively. The input device 516 may comprise, for example, a keyboard that allows an operator of the apparatus 510 to interface with the apparatus 510 (e.g., by an operator to verify a remedial step has been taken, as described herein). In some embodiments, the input device 516 may comprise a sensor, such as a camera, sound, light, and/or proximity sensor, configured to measure parameter values and report measured values via signals to the apparatus 510 and/or the processor 512. The output device 518 may, according to some embodiments, comprise a display screen and/or other practicable output component and/or device. The output device 518 may, for example, provide an interface (such as the interface 520) via which safety instructions and/or other necessary remedial steps are provided to a user (e.g., via a website and/or mobile device application). According to some embodiments, the input device 516 and/or the output device 518 may comprise and/or be embodied in a single device, such as a touch-screen monitor or a personal handheld device.

The memory device 540 may comprise any appropriate information storage device that is or becomes known or available, including but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, store one or more of cargo management logic 542-1, alert management logic 542-2, safety instructions 542-3, interface instructions 542-4, input data 544-1, cargo rules data 544-2, and/or interface element data 544-3. In some embodiments, the cargo management logic 542-1, alert management logic 542-2, safety instructions 542-3, interface instructions 542-4, input data 544-1, cargo rules data 544-2, and/or interface element data 544-3 may be utilized by the processor 512 to analyze input received by the communication device 514 from the sensor(s) and provide output information via the output device 518 and/or the communication device 514.

According to some embodiments, the cargo management logic 542-1 may be operable to cause the processor 512 to process the input data 544-1, rules data 544-2, and/or interface element data 544-3 in accordance with embodiments as described herein. Input data 544-1, rules data 544-2, and/or interface element data 544-3 received via the input device 516 and/or the communication device 514 may, for example, be analyzed, sorted, filtered, decoded, decompressed, ranked, scored, plotted, and/or otherwise processed by the processor 512 in accordance with the cargo management logic 542-1. In some embodiments, input data 544-1, rules data 544-2, and/or interface element data 544-3 may be fed by the processor 512 through one or more mathematical and/or statistical formulas and/or models in accordance with the cargo management logic 542-1 to merge transcribe, decode, convert, and/or otherwise process user input, as described herein.

In some embodiments, the alert management logic 542-2 may be operable to cause the processor 512 to process the input data 544-1, rules data 544-2, and/or interface element data 544-3 in accordance with embodiments as described herein. Input data 544-1, rules data 544-2, and/or interface element data 544-3 received via the input device 516 and/or the communication device 514 may, for example, be analyzed, sorted, filtered, decoded, decompressed, ranked, scored, plotted, and/or otherwise processed by the processor 512 in accordance with the alert management logic 542-2. In some embodiments, input data 544-1, rules data 544-2, and/or interface element data 544-3 may be fed by the processor 512 through one or more mathematical and/or statistical formulas and/or models in accordance with the alert management logic 542-2 to identify, classify, and/or otherwise compute an whether or not an alert communication is necessary, e.g., based on the completed cargo management analysis, as described herein.

According to some embodiments, the safety instructions 542-3 may be operable to cause the processor 512 to process the input data 544-1, rules data 544-2, and/or interface element data 544-3 in accordance with embodiments as described herein. Input data 544-1, rules data 544-2, and/or interface element data 544-3 received via the input device 516 and/or the communication device 514 may, for example, be analyzed, sorted, filtered, decoded, decompressed, ranked, scored, plotted, and/or otherwise processed by the processor 512 in accordance with the safety instructions 542-3. In some embodiments, input data 544-1, rules data 544-2, and/or interface element data 544-3 may be fed by the processor 512 through one or more mathematical and/or statistical formulas and/or models in accordance with the safety instructions 542-3 to identify, classify, and/or otherwise compute which one or combination of safety instructions are appropriate based on the cargo management analysis and alert management analysis and communicated to the operator.

According to some embodiments, the interface instructions 542-4 may be operable to cause the processor 512 to process the input data 544-1, rules data 544-2, and/or interface element data 544-3 in accordance with embodiments as described herein. Input data 544-1, rules data 544-2, and/or interface element data 544-3 received via the input device 516 and/or the communication device 514 may, for example, be analyzed, sorted, filtered, decoded, decompressed, ranked, scored, plotted, and/or otherwise processed by the processor 512 in accordance with the interface instructions 542-5. In some embodiments, input data 544-1, rules data 544-2, and/or interface element data 544-3 may be fed by the processor 512 through one or more mathematical and/or statistical formulas and/or models in accordance with the interface instructions 542-4 to generate and/or output various remedial elements, as described herein.

According to some embodiments, the apparatus 510 may comprise the cooling device 550. According to some embodiments, the cooling device 550 may be coupled (physically, thermally, and/or electrically) to the processor 512 and/or to the memory device 540. The cooling device 550 may, for example, comprise a fan, heat sink, heat pipe, radiator, cold plate, and/or other cooling component or device or combinations thereof, configured to remove heat from portions or components of the apparatus 510.

Any or all of the exemplary instructions and data types described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 510. According to some embodiments, the memory device 540 may be incorporated into and/or otherwise coupled to the apparatus 510 (e.g., as shown) or may simply be accessible to the apparatus 510 (e.g., externally located and/or situated).

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002@ published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application and are presented for illustrative purposes only. The described embodiments are not, and are not intended to be, limiting in any sense. The presently disclosures are widely applicable to numerous embodiments, as is readily apparent from the disclosure. One of ordinary skill in the art will recognize that the disclosures may be practiced with various modifications and alterations, such as structural, logical, software, and electrical modifications. Although particular features of the disclosure may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards, or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the disclosure as defined by the claims appended hereto.

What is claimed is:

1. A trailer safety management system, comprising:
a controller in communication to a network, the controller comprising a non-transitory memory storing (i) a set of cargo management rules, (ii) a set of alert rules, and (iii) a set of operating instructions;
a sensor disposed within a storage device and in communication with the network, the sensor configured to capture data descriptive of at least one cargo object retained by a door of the storage device, wherein the storage device comprises a locking mechanism providing selective ability to open the door of the storage device;
wherein the controller uses the set of cargo management rules to:
analyze the data descriptive of at least one cargo object retained by the door of the storage device as received by the sensor;
communicate an alert condition based on the analyzed data when compared to the set of alert rules receivable by a user in a position to open the door of the storage device; and
communicate at least one operating instruction of the set of operating instructions based on the analyzed data when compared to the alert rules, wherein the at least one operating instruction includes a preventative instruction, including an instruction to a user to move to a remote location before unlocking and opening the door and an instruction to attach a remote opening assembly to the door of the storage device, to a user before unlocking the locking device;
and
wherein the remote opening assembly includes an arresting mechanism that attaches to at least one of the locking mechanism and the door of the storage device.

2. The trailer safety management system of claim 1, wherein the alert condition communication to a user in a position to open the door of the storage device comprises at least one of (i) transmitting a command that causes a warning light to illuminate, (ii) transmitting a command that causes a sounding device to sound, and (ii) transmitting a command that causes a portable electronic device to vibrate.

3. The trailer safety management system of claim 1, wherein the data descriptive of the at least one cargo object retained by the door comprises at least one of pressure data and strain data.

4. The trailer safety management system of claim 1, wherein the data descriptive of the at least one cargo object retained by the door comprises at least one of sound data and light data.

5. The trailer safety management system of claim 1, wherein the data descriptive of the at least one cargo object retained by the door comprises image data.

6. The trailer safety management system of claim 1, wherein the cargo alert condition is descriptive of at least one of a cargo tipping condition, a cargo overturning condition, a cargo damage condition.

7. The trailer safety management system of claim 1, wherein the preventative instruction includes an instruction that re-orients the at least one cargo object within the storage device.

8. The trailer safety management system of claim 1, wherein the network is a local area network (LAN).

9. The trailer safety management system of claim 1, wherein the preventative instruction is displayed on the controller.

10. A method of alerting a user in a position to open a door of a portable storage device of a cargo condition, comprising:
sensing a condition of at least one cargo object within a storage device having a door and a locking mechanism, using a sensor disposed within a storage device and in communication with a network, the sensor configured to capture data descriptive of the at least one cargo object retained by a door of the storage device,
communicating the data descriptive of the at least one cargo object through the network to a controller, wherein the controller is connected to the network;
comparing the data descriptive of the at least one cargo object to a predetermined set of cargo management rules stored within a non-transitory memory of the controller;
communicating an alert condition receivable by a user in a position to open the door of the storage device based on the compared data when compared to a set of alert rules stored within a non-transitory memory of the controller; and communicating at least one operating instruction based on a set of operating instructions stored within a non-transitory memory of the controller, wherein the at least one operating instruction includes a preventative instruction, including an instruction to a user to move to a remote location before unlocking and opening the door and an instruction to attach a remote opening assembly to the door of the storage device, to a user before unlocking the locking device; and wherein the remote opening assembly includes an arresting mechanism that attaches to at least one of the locking mechanism and the door of the storage device.

11. The method of claim 10, wherein the network is a local area network (LAN).

12. The method of claim 10, wherein the network is a cellular data network.

13. The method of claim 10, wherein the alert condition communicating an alert condition step comprises at least one of (i) transmitting a command that causes a warning light to illuminate, (ii) transmitting a command that causes a sounding device to sound, and (ii) transmitting a command that causes a portable electronic device to vibrate.

14. The method of claim 10, wherein the data descriptive of the at least one cargo object retained by the door comprises at least one of pressure data, strain data, sound data, light data, and image data.

15. The method of claim 10, wherein the cargo alert condition is descriptive of at least one of a cargo tipping condition, a cargo overturning condition, a cargo damage condition.

\* \* \* \* \*